United States Patent
Murata

(10) Patent No.: US 6,509,980 B1
(45) Date of Patent: Jan. 21, 2003

(54) FACSIMILE APPARATUS

(75) Inventor: Yoshinori Murata, Tenri (JP)

(73) Assignee: Murata Kikai Kabushiki Kaisha, Kyoto (JP)

(*) Notice: Subject to any disclaimer, the term of this patent is extended or adjusted under 35 U.S.C. 154(b) by 591 days.

(21) Appl. No.: 08/969,653

(22) Filed: Nov. 13, 1997

(30) Foreign Application Priority Data

Nov. 15, 1996 (JP) .............................................. 8-305025

(51) Int. Cl.⁷ ................................................. H04N 1/40
(52) U.S. Cl. ..................................... 358/444; 358/400
(58) Field of Search ............................... 358/400, 444, 358/404, 468, 434, 435, 436, 438, 439, 407; 379/100.01

(56) References Cited

U.S. PATENT DOCUMENTS

| | | | |
|---|---|---|---|
| 4,935,955 A | * 6/1990 | Neudorfer | 379/100 |
| 5,200,830 A | 4/1993 | Imaizumi et al. | 358/296 |
| 5,237,427 A | * 8/1993 | Mizutori | 358/406 |
| 5,367,564 A | * 11/1994 | Sutoh | 379/100 |
| 5,519,507 A | * 5/1996 | Subramaniam | 358/402 |

FOREIGN PATENT DOCUMENTS

| | | |
|---|---|---|
| EP | 0 618 716 A1 | 10/1994 |
| EP | 0 630 145 A1 | 12/1994 |
| GB | 2015301 A | 9/1979 |
| JP | 07239763 | 9/1995 |

OTHER PUBLICATIONS

Copy of European Patent Office Communication for European Patent Application No. 97120030.8-2202 including European Search Report dated Oct. 27, 1999.

* cited by examiner

Primary Examiner—Jerome Grant, II
(74) Attorney, Agent, or Firm—Armstrong, Westerman & Hattori, LLP

(57) ABSTRACT

A facsimile apparatus (device) having a plurality of lines connected thereto and which is capable of make facsimile communication in the parallel use of these lines. More specifically, when a plurality set of data is being received through two or more lines in parallel, the facsimile device of the present invention allows the set of data that has completed storage of its first one page content most quickly to preferentially use a printer. Then that set of data is allowed to continue delivering the hard copy of whole pages and releases the printer after completing the delivery. The image data of the other set of data that was not able to occupy the printer is stored in the memory and printed out after the release of the printer. As each entire page of a set of data is successively output, image data of other sets of data is never mixed with the currently output one.

3 Claims, 6 Drawing Sheets

FIG. 2

| | TABLE NO.:1 | 2 | ... | n |
|---|---|---|---|---|
| 19a OPERATION STATUS | | | | |
| 19b JOURNAL DATA POINTER | | | | |
| 19c NUMBER OF RECEIVED PAGES | | | | |
| 19d NUMBER OF PRINTED PAGES | | | | |
| 19e NUMBER OF ERASED PAGES | | | | |
| 19f LINE NO. | | | | |
| 19g RECEPTION TIME | | | | |

INTERCEPTED RECEPTION NOTICE

NOVEMBER 22, '96 (FRIDAY) 11:10

FIRST LINE

| NO. | OPPOSITE PARTY TO CALL | MODE | STARTING DAY & TIME | DURATION | NUMBER OF PAGES | CLASSI-FICATION | RESULT | MEMO |
|---|---|---|---|---|---|---|---|---|
| 001 | AAA CO., LTD. | STANDARD | 21, 11:07 | 0' 12" | 1 | 0000 | # OK | |
| 002 | BBB BANK LTD. | HIGH IMAGE QUALITY | 22, 10:07 | 1' 48" | 3 | 1111 | # OK | |
| 003 | CCC CO., LTD. | STANDARD | 22, 11:30 | 0' 30" | 1 | 2222 | # OK | |

SECOND LINE

| NO. | OPPOSITE PARTY TO CALL | MODE | STARTING DAY & TIME | DURATION | NUMBER OF PAGES | CLASSI-FICATION | RESULT | MEMO |
|---|---|---|---|---|---|---|---|---|
| 001 | DDD INDUSTRY | HIGH IMAGE QUALITY | 22, 09:11 | 0' 45" | 1 | 0001 | # OK | |
| 002 | EEE CO., LTD. | STANDARD | 22, 10:45 | 0' 11" | 1 | 0002 | T.1.2 | |

AN INTERCEPTED RECEPTION(S) HAS(HAVE) BEEN ERASED...

FACSIMILE APPARATUS

BACKGROUND OF THE INVENTION

1. Field of the Invention

The present invention relates to a facsimile apparatus or more particularly to a facsimile apparatus having a plurality of lines connected thereto and capable of simultaneous communications through each line.

2. Description of the Related Art

Heretofore, a facsimile apparatus having a plurality of lines connected thereto has been prevailing, and it has become possible to make simultaneous communications with different parties to call by connecting thereto a facsimile communication network or ISDN, besides the telephone network.

In a facsimile apparatus having (for example) two lines connected thereto, while facsimile transmission is being performed through one line by utilizing memory transmission or memory reception functions, facsimile reception may be performed through the other line. Or two facsimile receptions or two facsimile transmissions may be simultaneously conducted in parallel through both lines.

In a conventional facsimile device, the outputting sequence onto the recording paper follows the reception sequence (reception starting sequence) when different facsimile receptions are carried out in parallel through a plurality of lines. For this reason, when an initially received data has been transmitted in high quality image mode (fine mode) thus the volume of data is large and the communication time increases, the hard copy of a subsequently received data where the volume of data is small has to wait until the hard copy of the initially incoming one has been completed.

In other words, even if this facsimile system is provided with a page printer with which high speed printing has been realized, when the initially incoming data is of a large data quantity per one page and thus requiring an increased amount of time before delivering the hard copy, a hard copy of a later incoming data cannot be delivered even though its first page content has been quickly stored, until the hard copy of the initial data has been delivered. As a result, this system as a whole tends to take long time for delivering the hard copy.

Some conventional facsimile devices capable of processing a plurality of printing demand from a plurality of superior devices have proposed storing printing data in an external storage unit when the data cannot be immediately printed out due to the printer's currently being engaged with another printing (Japanese Paten Application 7-239763, for example). The stored printing data are then printed out as soon as the printer becomes available.

However, in such conventional devices, the outputting sequence onto the recording paper follows the reception sequence (storage starting sequence). That is, even if a later arriving data of small data quantity completes the storage of its first one page content earlier than the previously arriving data, it (the later arriving data) still has to wait for its printing out until the printing of the earlier arriving data is over. In short, none of these conventional facsimiles have disclosed means for making the later arriving data like described above preferentially occupy the printer when it quickly finishes its storage.

SUMMARY OF THE INVENTION

Conceived in view of the aforementioned situation, it is an object of the present invention to propose a facsimile apparatus which enables to reduce the time required for delivering the hard copy from the system as a whole by controlling the hard copy delivery sequence of the received data through a plurality of lines.

For attainment of the above-described object, a first aspect of the present invention is proposed where a facsimile device having a plurality of lines connected thereto includes: storage means for storing reception time of each received data, the reception time being time at which reception of first one page content of each received data is complete; and control means for delivering hard copies of each received data in a time-sequence starting from the one of which the reception time is the oldest.

Since the storage means may successively make a plurality of data reception through the same line and sequentially store the received data in the memory, the reception time when reception of one page content has been completed is stored for each data reception and not for each line. If it is so arranged beforehand that a plurality of reception times may be stored for each line, the storage capacity of the storage means as a whole increases, and therefore a measure to ensure provision of the storage regions is taken every time a data reception is started through each line.

According to the first aspect of the present invention, the printing sequence of the received data is determined based on the reception completed time at which the storage of one page content of each data is complete. Thus, even if the earlier incoming data received through one line has large data quantity thus requiring a long time before providing its hard copy, a hard copy of a later incoming data of smaller quantity received through another line may be provided as soon as the storage of its one page content is complete. As a result, the time taken for providing overall hard copies can be significantly reduced compared to a conventional device.

As a second aspect of the present invention, the control means of the facsimile device described above delivers the hard copies of each received data in a sequence that is preset in the storage means if a plurality of the received data share the same oldest reception time.

The predetermined sequence includes the sequence of numbers (table numbers) preliminarily assigned to the storage regions secured for respective lines when the data reception has been started therethrough and the storage starting sequence or the incoming sequence etc.

According to the second aspect of the present invention, even if there are a plurality of data receptions that share the same oldest reception complete time of one page content, a hard copy of each received data may be delivered without any confusion in a preset sequence.

As a third aspect of the present invention, the control means of the facsimile device of the first or second aspect, once the hard copy of a received data has started, does not provide hard copies of other received data until the hard copy of the whole page content (of the currently being delivered one) has been delivered. This, when a hard copy of one received data has begun to output, prevents other different received data from being delivered as hard copies and mixed between pages of the currently being delivered one.

According to the third aspect of the present invention, once the delivery of hard copy of one received data has been started, hard copies of other received data are not delivered until the output of all pages of the one data is complete. Therefore, outputs of different received data of different reception time can not be mixed between pages.

BRIEF DESCRIPTION OF THE ACCOMPANYING DRAWINGS

FIG. 2 illustrates one embodiment of the storage means.

FIG. 6 illustrates an example of the intercepted and erased reception notice.

DETAILED DESCRIPTION OF THE PREFERRED EMBODIMENT

Hereafter, an embodiment of the present invention will be described with reference to the accompanying drawings.

Figure 1:
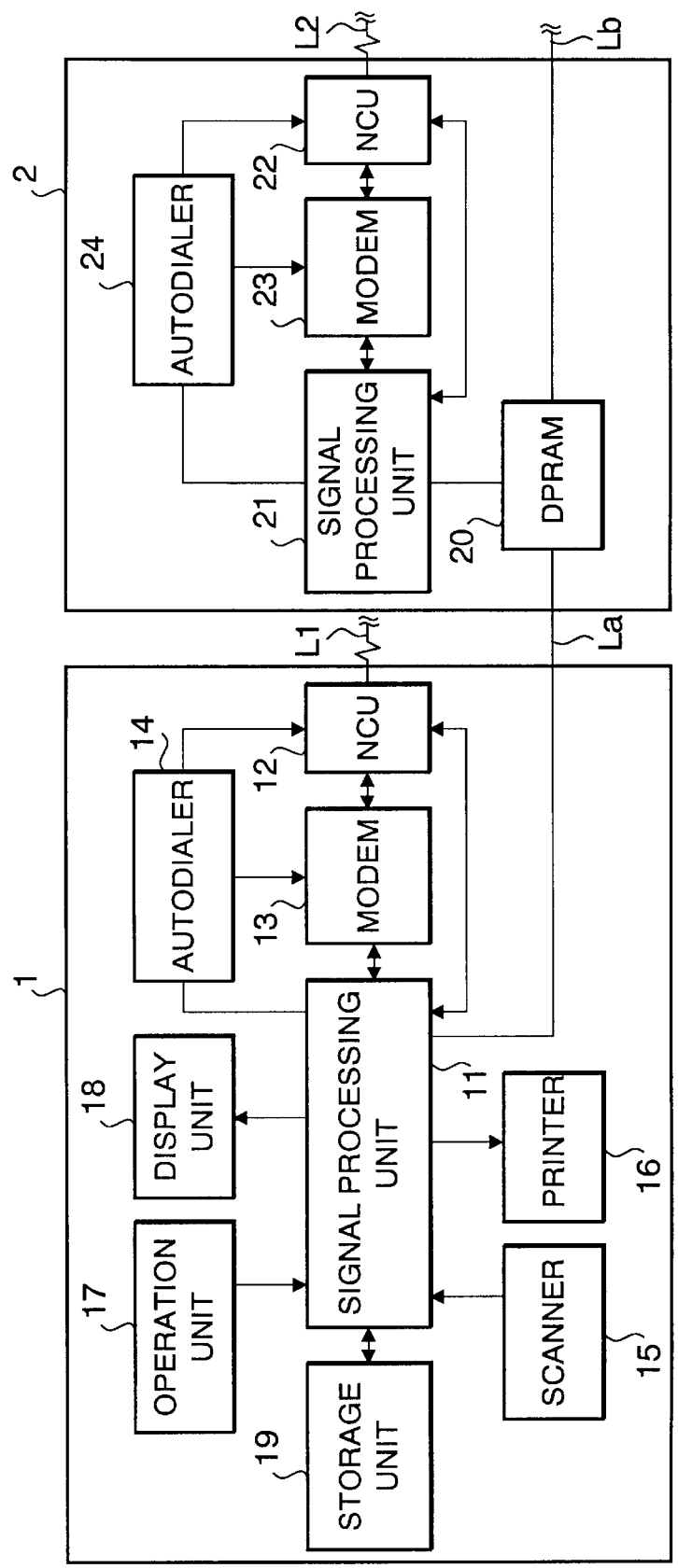
FIG. 1 is a block diagram illustrating one embodiment of the facsimile apparatus of the present invention.

FIG. 1 is a block diagram illustrating an example of the arrangement of a facsimile device having a plurality of lines connected thereto according to the invention.

The present arrangement has one or more of option boards 2 added to a facsimile device proper 1, with lines L1 connected to the facsimile device proper 1 and L2 connected to the option board 2 for conducting facsimile communication. The facsimile device proper 1 and the option board 2 mainly constitute a facsimile apparatus (device or system) of the present invention.

In this case, the facsimile device proper 1 functions as a master unit, and each option board 2 functions as a slave unit, such that data transfer is made between the facsimile proper 1 and the option board 2 through a dual port RAM 20 (hereinafter referred to as DPRAM).

In short, the facsimile device proper 1 and a plurality of option boards 2 are daisy-chain connected by connection lines La, Lb, . . . , to make the data transfer through the DPRAM 20 of each option board 2 on the transfer paths.

It should be noted that the arrangement of the system with the connections made through a plurality of lines L1 and L2 . . . is not limited to the aforementioned, but it may be arranged by providing a plurality of connections on the facsimile device proper 1. Further, the slave units for augmenting the lines are not limited to independent units, or option boards etc. which are removably mounted on the facsimile device 1, but they may be arranged as circuit parts which occupy a part of LSI on the circuit board.

The facsimile system proper 1 in FIG. 1 includes a signal processing unit 11 as control means with a CPU etc., NCU 12 (network control unit) for connecting a telephone line L1, a modem 13 for making facsimile communications through the telephone line L1, an autodialler 14 for automatically calling the telephone number of the parties to call, a scanner 15 for read-scanning the images of the text, a printer 16 for recording the facsimile received image on recording paper, an operation unit 17 arranged with a keypad and various setting keys, a display unit 18 comprising a liquid crystal screen, and a storage unit 19 having ROM and RAM.

It should be noted that the signal processing unit 11 includes such processing function units as for facsimile communication control, memory control and coding/decoding processing of image data.

Besides DPRAM 20, one option board 2 is provided with a signal processing unit 21, NCU 22, modem 23 and autodialler 24 similar to the system proper 1, to enable the facsimile communications to be made through the telephone line L2 connected to NCU 22 independent of the telephone line L1 connected to the system proper 1.

The data received by the option board 2 is transferred to the system proper 1 through DPRAM 20, to be outputted from the hard copy delivery unit 16. The data transfer from the option board 2 to the system proper 1 is made when the signal processing unit 11 of the system proper 1 reads out the data which the signal processing unit 21 of the option board 2 has written into DPRAM 20.

Besides the image memory for storing the received image data, the storage unit 19 is provided with storage means for storing each reception time at which the reception of one page content of each received data has been completed. The signal processing unit 11 decides the printing sequence by the hard copy delivery unit 16 by referring to this reception time and then out puts the received data on to the recording paper accordingly.

FIG. 2 illustrates an embodiment of the storage unit 19.

The storage unit 19 shown here includes tables used for controlling the printing sequence etc.. By retrieving tables being not in use at every data reception, the storage areas corresponding to respective table numbers (1-n) can be ensured. Therefore, even if different data receptions continue through the same line L1 or L2 and the received data are successively stored into the image memory, the storage areas are always ensured at every data reception, enabling positive hard copy delivery.

This storage unit 19 stores under each table number the operation status (state) 19a, journal pointer 19b being a pointer for the area in which the communication control data is housed, the number of received pages 19c, the number of pages that have been printed 19d, the number of pages that have been erased 19e, the line number 19t for identifying the lines L1 and L2 through which the reception has been started, and the reception time 19g when the reception of one page content has been completed. It is to note that the journal pointer 19b is set at the completion of reception in preparation for delivering the hard copy of intercepted and erased reception notice (later described, refer to FIG. 6).

With such an arrangement as hereinabove described, the signal processing unit 11 makes control such that the hard copies are delivered from the received data in the sequence starting from the one whose time of reception 19g through the line L1 or L2 is the oldest.

Figure 3:
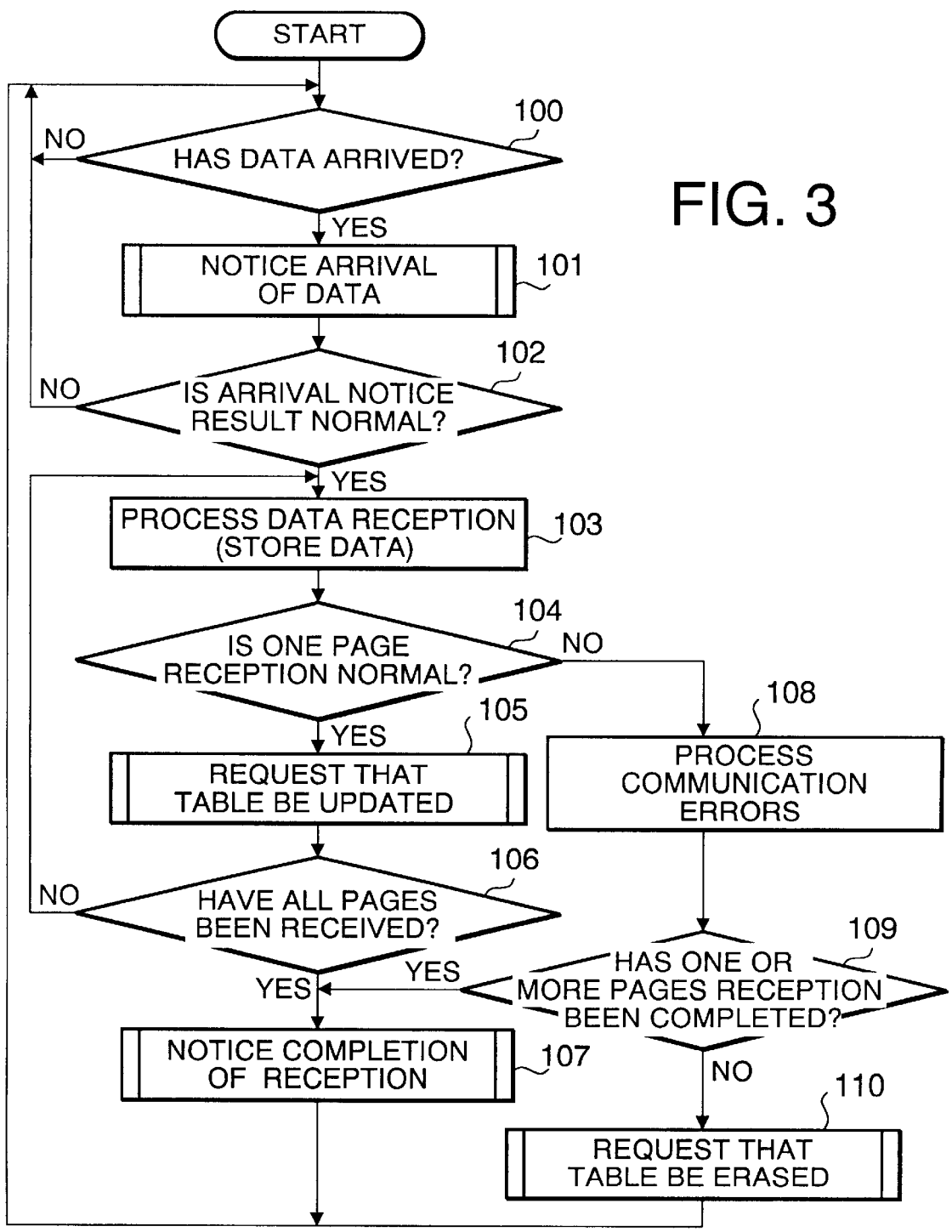
FIG. 3 is a flowchart showing the basic operation of the facsimile device of the present invention (data reception processing).
Figure 4:
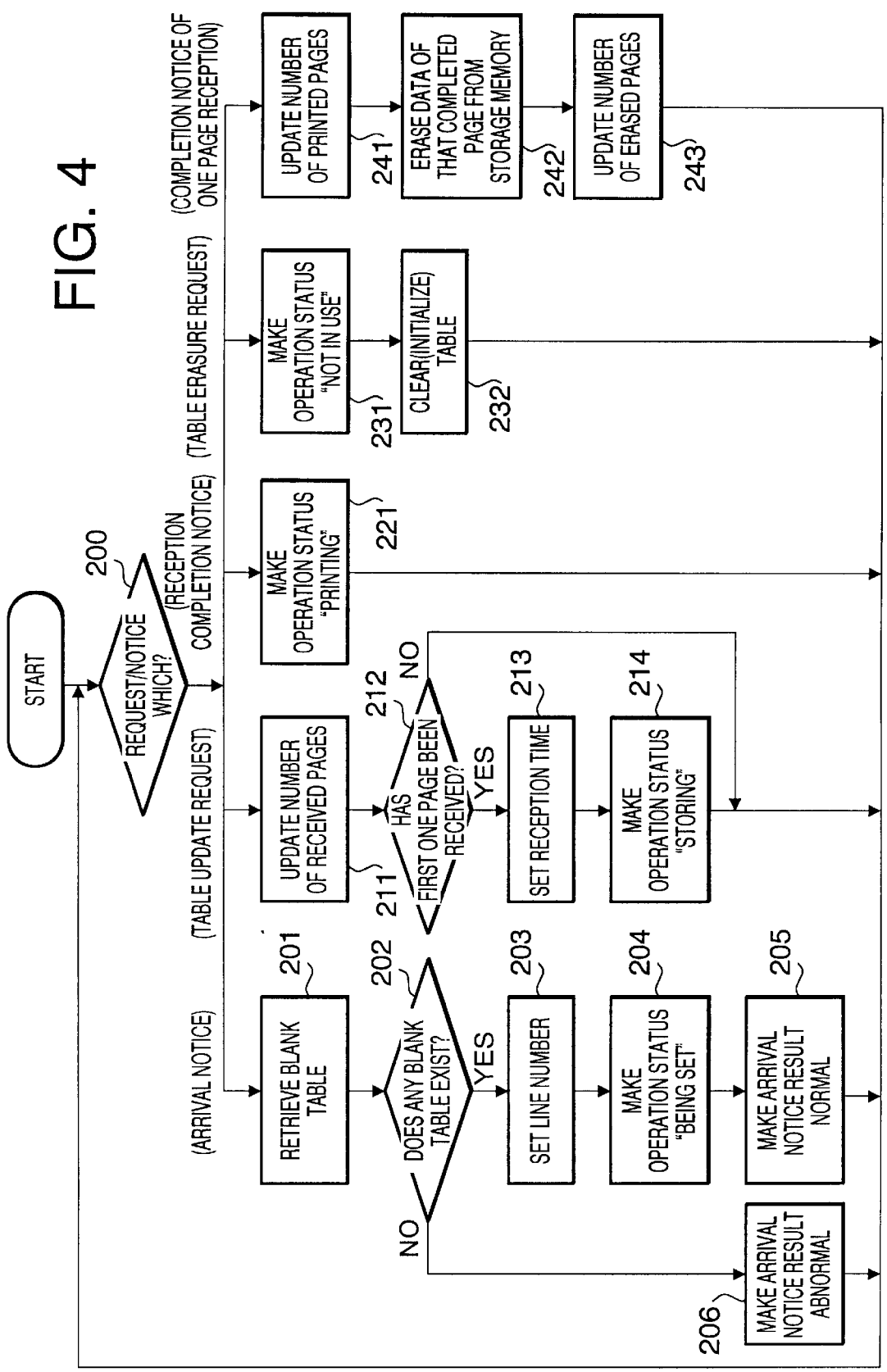
FIG. 4 is a flowchart showing the basic operation of the facsimile device of the present invention (data update processing).
Figure 5:
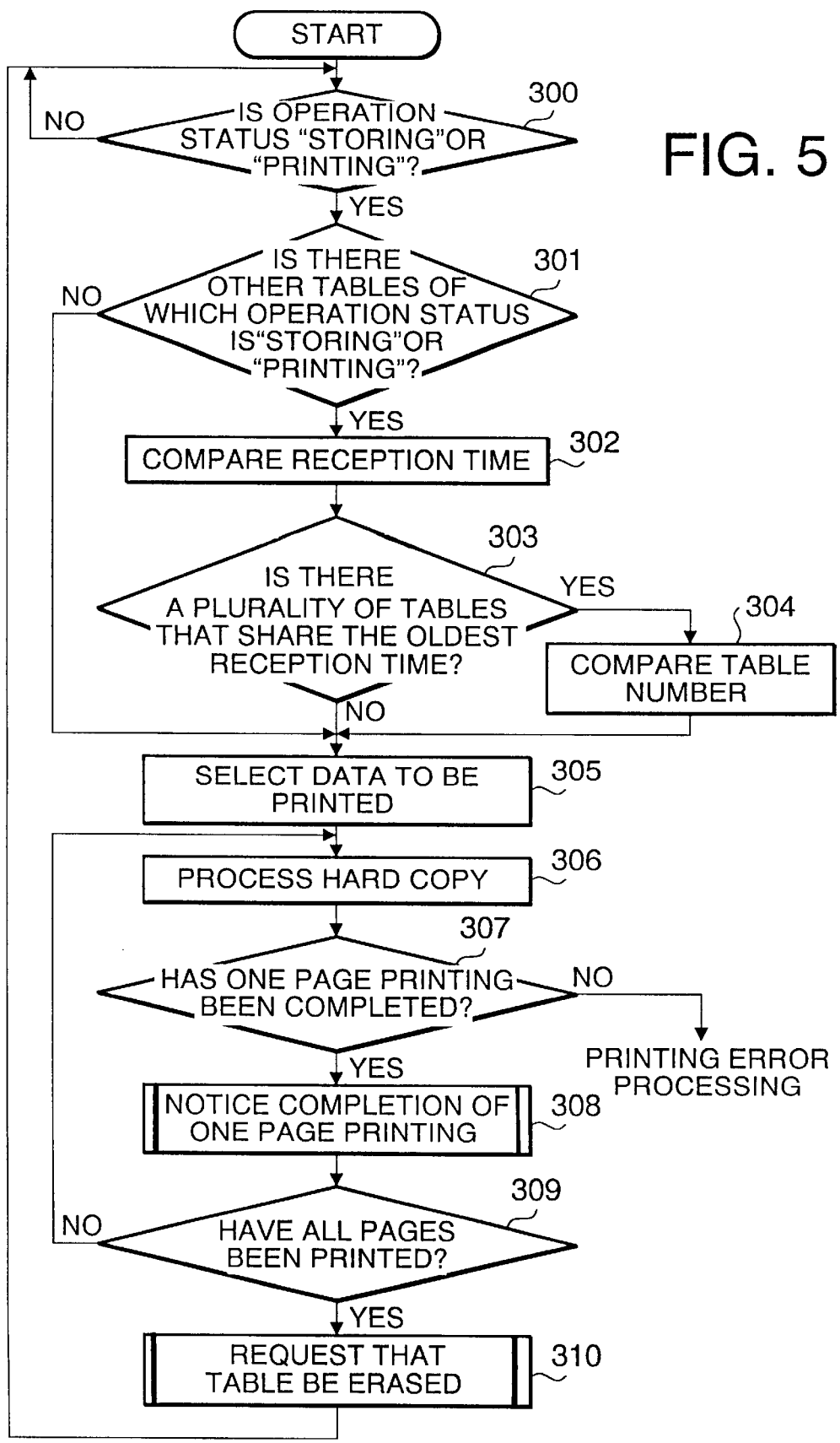
FIG. 5 is a flowchart showing the basic operation of the facsimile device of the present invention (hard copy delivery processing).

In the following the basic operations of the present invention will be described in reference to the flowchart of FIGS. 3–5. FIG. 3 shows the operation of processing data reception, FIG. 4 shows the operation of updating table (updating the storage unit 19), and FIG. 5 shows the operation of processing hard copy delivery.

These 3 processings operate in parallel. The data reception processing and the hard copy delivery processing make various requests and notices to the table update processing, and in response thereto, the table update processing is to set or update the content of the storage unit 19.

The data reception processing of FIG. 3, an arrival notice to the table update processing is at first made upon arrival of signal. If this has given a normal result, data reception is started and the received data is successively stored into the image memory. Every time a data of one page content has been received, a table update request is made. Upon completion of reception of a full page, a reception completion notice is made then returning to the incoming signal awaiting state (Steps 100–107).

However, if any abnormality has arisen during the reception, this is taken as a communication error. Then, if reception of one or more pages have not been completed, a table erasure request is made, but if completed, a reception completion notice is made (Steps 108–110).

The table update processings of FIG. 4 perform the following respective processings according to the respective types of requests and notices.

Upon receiving the arrival notice, the table giving the operation status 19a of "not in use" (vacant table) is retrieved. If any vacant table is found, the line number 19f for identifying the line L1 or L2 through which the incoming signal has been transmitted is set and the operation status 19a is changed to "being set" to indicate the arrival notice result to be normal. But if no vacant table is found, the arrival notice result is indicated to be abnormal (Steps 201–206). Accordingly, the data reception processing determines whether or not the data reception is to be commenced.

Every time the table update request is received, the number of received pages 19c is counted up by one page, and as this count turns from "0" to "1", this point of time is taken in from the clock circuit (not shown in the chart), to beset under the reception time 19g. Then the operation status 19a is set to "storing" (Steps 211–214). If the number of received pages is two or more, the processings of Steps 213 and 214 are not performed.

The operation status 19a is set to "printing" upon receiving the reception completion notice and the operation status 19a is returned to "not in use upon receiving the table erasure request, then the number of received pages 19c is set to "0" and such other contents are cleared (initialized).

Every time one page completion notice has been received from the hard copy processing, the number of pages printed 19d is counted up by one page. Then the data on this page is erased from the image memory (storage memory),and the number of erased pages 19e is counted up by one page (Steps 241–243).

In the present embodiment, only one hard copy is output from each received data and therefore the update timing of the number of printed pages 19d and that of the number of erased pages 19e are the same. When a plural number of hard copies are output from each received data, the number of printed pages 19d is updated upon completely outputting each hard copy while the number of erased pages 19e is updated when the last hard copy has been completed. This makes it possible to discern the page which is being printed from the one which has been completely printed out.

In the hard copy processing of FIG. 5, the printing-out operation may be started if the operation status 19a is in "storing" that represents the complete data reception of one page content (first page) or in "printing" that represents the complete data reception of all pages. If there have been found some which are in "storing" or "printing" state, their reception times 19g are compared to provide hard copies from the oldest one. If there are a plurality of the oldest ones, the data to be printed are selected so that they are outputted in the order of increasing table numbers (1-n) (Steps 300–305).

In the selection of the data to be output described above, the data whose operation status is in "storing" or "printing" is selected. However, it should be noted that the data whose number of received pages 19c is equal to or larger than "1" may be selected.

As the printing sequence is determined according to the time at which the data reception of one page content has been completed, even if the previously incoming received data has a large data quantity thus taking a long time before its printing-out, printing-out a later received data of smaller data quantity may be started as soon as one page content of the data has been stored. As a result, the overall printing-out time may be significantly curtailed.

In addition, the determining way of the printing sequence is not limited to the order of table numbers. When there are a plurality of data received at the same oldest reception time 19g, the printing sequence of the data may be determined in the order of reception, in short, in the order in which they were stored into the storage unit 19. In this case, the time when each data began to be stored in the storage unit 19 may have to be stored in the storage unit 19.

Subsequently, the selected data is read from the image memory to provide its hard copy by the hard copy delivery unit 16. Then every time the printing of one page has been completed, a one page completion notice is provided to the table update processing and upon completion of printing all pages, a table erasure request is made (Steps 306–310). It should be noted that if the number of pages printed 19d becomes equal to the number of received pages 19c when the operation status 19a is in "storing", the hard copy providing operation is temporarily interrupted.

In this way, once the hard copy of one received data is started to be provided, hard copies of other received data will not be provided until the hard copy of all page content (of the currently being output data) has been completely provided. Accordingly, hard copies of different received data (data received at different reception time) can not be mixed between pages of the currently being output data.

Next, in the following, intercepted and erased reception notice will be described.

If any memorization that some data could not have been printed out due to a power failure is confirmed at the turning on after the power failure (a restoration), the operation status 19a of the storage unit 19 is set to "power failure". Tables whose operation statuses are in "power failure" are then retrieved, and the printing content of an intercepted and erased reception notice as shown in FIG. 6 is edited and output by referring to the communication control data based on the journal pointer 19b in the order of the data reception time, that is, from the data stored at the oldest reception time 19g (if there are several of the oldest ones, in the order of the table numbers similarly as above-described). For this purpose, nonvolatile EEPROM etc. are used for the storage unit 19 or the facsimile proper 1 is equipped with a battery for memory backup.

What is claimed is:

1. A facsimile apparatus having a plurality of lines connected thereto comprising:

storage means for storing a reception time of each received data being received by way of each line, the reception time beings time at which reception of first one page content of each received data is complete; and control means for delivering hard copies of each received data in a time-sequence starting from the one of which the reception time is the oldest.

2. The facsimile apparatus as recited in claim 1, wherein the control means delivers the hard copies of each received data in a sequence that is preset in the storage means if a plurality of the received data share the same oldest reception time.

3. The facsimile apparatus as recited in claims 1 or 2, wherein once the control means has started hard copy delivery of a set of received data, it does not deliver hard copies of any other set of received data until the hard copy of total page content of the set of received data has been delivered.

* * * * *